A. B. ANDERSON & J. L. PETERSEN.
SAW SET.
APPLICATION FILED MAR. 16, 1916.
1,205,072.
Patented Nov. 14, 1916.
2 SHEETS—SHEET 1.
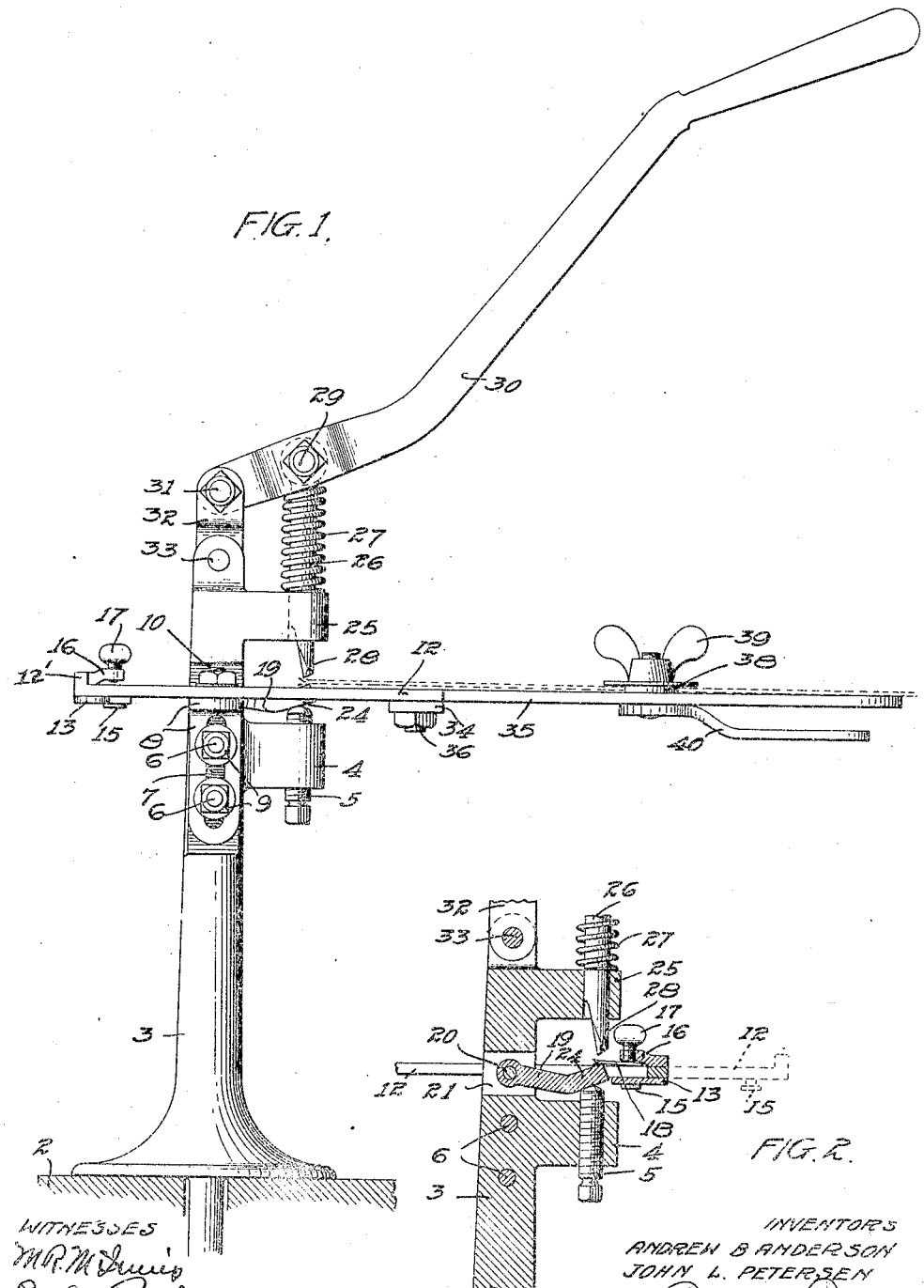

A. B. ANDERSON & J. L. PETERSEN.
SAW SET.
APPLICATION FILED MAR. 16, 1916.

1,205,072.

Patented Nov. 14, 1916.
2 SHEETS—SHEET 2.

WITNESSES

INVENTORS
ANDREW B. ANDERSON
JOHN L. PETERSEN

ATTORNEYS

UNITED STATES PATENT OFFICE.

ANDREW B. ANDERSON AND JOHN L. PETERSEN, OF LAKE MILLS, IOWA.

SAW-SET.

1,205,072.  Specification of Letters Patent.  Patented Nov. 14, 1916.

Application filed March 16, 1916. Serial No. 84,573.

*To all whom it may concern:*

Be it known that we, ANDREW B. ANDERSON, citizen of the United States, and JOHN L. PETERSEN, citizen of the Kingdom of Denmark, residents of Lake Mills, Winnebago county, Iowa, have invented certain new and useful Improvements in Saw-Sets, of which the following is a specification.

The object of our invention is to provide a saw set adapted for bench work in setting the teeth of small circular saws and band saws.

A further object is to provide a saw set by means of which the teeth of either type of saw can be easily and quickly set.

Other objects of the invention will appear from the following detailed description.

The invention consists generally in various constructions and combinations, all as hereinafter described and particularly pointed out in the claims.

Figure 3:
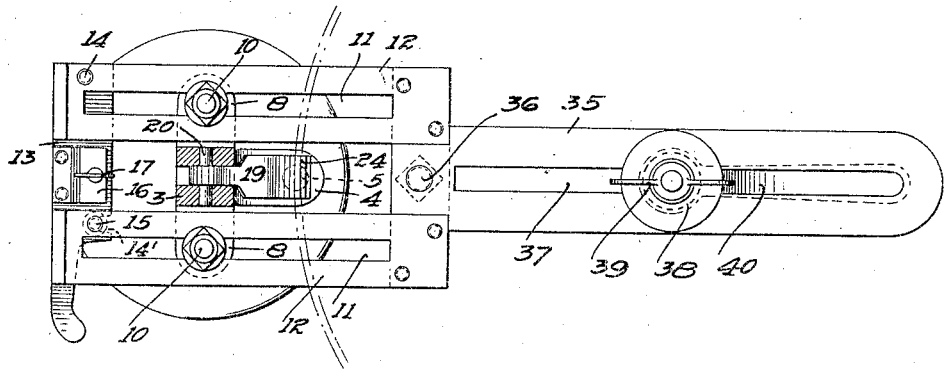
Figure 4:
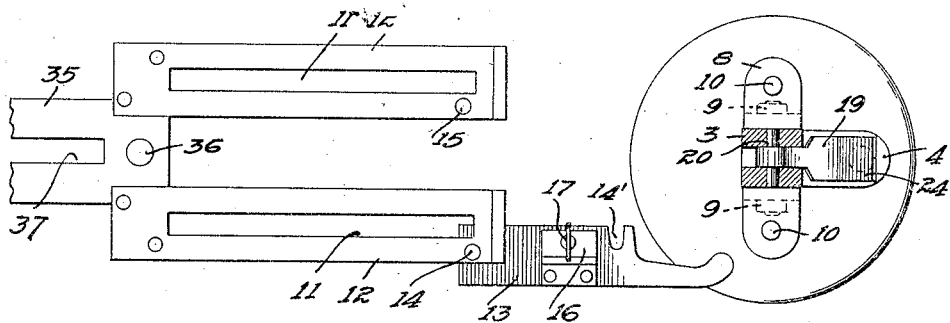
Figure 5:
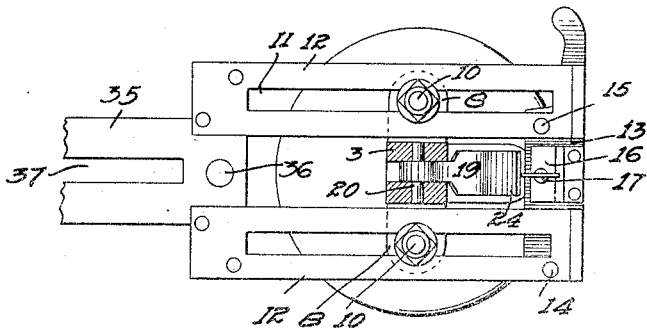

In the accompanying drawings forming part of this specification, Figure 1 is a side view of a saw set embodying our invention, Fig. 2 is a detail sectional view, showing the device adapted for setting the tooth of a small band saw, Fig. 3 is a horizontal sectional view, showing the device adapted for setting the teeth of a circular saw, Fig. 4 is a detail sectional view, showing the saw support reversed to adapt it for setting a small band saw, the parts being separated, ready for assembling, Fig. 5 shows the parts of the set assembled, ready to receive the band saw.

In the drawing, 2 represents a portion of a bench or other support and 3 an upright standard mounted thereon. 4 is a bracket formed integrally with the standard and projecting horizontally therefrom and having a set screw 5 mounted for vertical adjustment in the bracket. Near this bracket and extending transversely through a standard are bolts 6 having ends projecting beyond the standard on each side and into vertical slots 7 provided in brackets 8 which are adjustable on said bolts and are normally rigidly held by means of suitable nuts 9 on the threaded ends of the bolts. Upon loosening these nuts, the brackets can be raised or lowered to adjust them with respect to the saw setting jaws. The brackets 8 have bolts 10 mounted vertically therein and fitting within slots 11 in plates 12 arranged in parallel relation with one another and adapted to straddle the standard 3 and seated on the upper ends of the brackets 8. Upon loosening the bolts 10 the plates 12 are rendered slidable back and forth on the supporting standard.

On one of the plates 12 a gate 13 is pivoted at 14 and arranged to swing across the gap between these plates and close one end thereof and is provided with a slot 14' to receive the pin 15 which depends from the underside of the opposite plate. A jaw 16 is mounted on this gate and carries a thumb screw 17 that is mounted to bear on the blade of the small band saw 18 and press it upon the supporting plates 12 during the setting operation. The plates 12 have upwardly turned ends 12' against which the rear edge of a band saw may be seated and held while its teeth are being set.

A setting jaw 19 is pivoted at 20 within a recess 21 in the standard 3 and has an upwardly turned end portion 24 adapted to bear on the adjusting screw 5 and be supported thereby, vertical movement of this screw raising or lowering the end 24 until the desired or proper setting position therefor is obtained. The upper surface of the end 24 forms a seat for the tooth of the saw. Above this jaw 19 is a bracket 25 corresponding to the bracket 4 and substantially parallel therewith and having a guide formed therein in which the upper or movable jaw of the set 26 is mounted to slide, being normally held in its raised position by the tension of a compression spring 27. This jaw has a lower beveled end 28 which engages the upper face of a tooth for the purpose of bending or setting it to the desired angle with respect to the plane of the blade.

The upper end of the jaw 26 is pivotally connected at 29 to a lever 30 that is pivotally connected at 31 to a link 32 that is pivotally supported at 33 in the upper end of the standard. When the lever 30 is depressed, the jaw 26 will be forced downwardly to coöperate with the upper face of the end 24 to set the tooth. A bar 34 is riveted at its ends to the plate 12 bridging the gap between them, and an extension plate 35 is notched at one end to fit in between the plates 12 and is secured to the bar 34 by a bolt 36. This extension plate 35 has a longitudinal slot 37 therein in which a hub 38 is mounted to slide and is secured by a wing nut 39 engaging the threads of a bolt carried by a lever 40 arranged on the underside of the plate 35. The hub 38 is adapted to enter the opening in the center of the circular saw and when the wing nut is tightened, the saw will be securely held in the slot 37, the hub being adjusted in the slot until the teeth of the saw are properly positioned with respect to the setting jaws.

In using the device for a circular saw, the plates 12 are adjusted and secured and the extension 35 forming a continuation of these plates has the hub 38 adjusted thereon until the teeth of the saw are properly positioned between the movable and normally stationary jaw or anvil of the set, this normally stationary jaw being first moved by the adjustment of the screw 5 until its upper face is in proper angular relation to the teeth of the band saw. The operator then grasps the lever 30 and moving the jaw 26 into engagement with the upper surface of a tooth can set it to the desired angle or width of set. Various widths of blades of band saws can be placed in the set by loosening the bolts 10 and sliding the plates 12 thereon to regulate the distance between the jaws of the set and the clamp 16. Whenever desired, the gate 13 supporting the jaw 16 can be swung outwardly, allowing the plates 12 to be reversed on their support and presenting an extension plate 35 opposite the jaws to adapt the tool for use with a circular saw.

We claim as our invention:

1. The combination, with a standard, of circular and band saw supports carried thereby, saw setting jaws mounted on one side of said standard, said saw supports being capable of reversal to position either a circular or band saw between said jaws.

2. The combination, with an upright standard, of plates mounted to slide transversely thereof and having means on one side of said standard for clamping a circular saw and on the opposite side a band saw clamping means, tooth setting jaws carried by said standard, said plates being reversible on said standard to position either said circular saw clamping means or said band saw clamping means opposite said tooth setting jaws.

3. The combination, with an upright standard having brackets projecting outwardly therefrom, an adjusting screw mounted in the lower bracket and vertically adjustable therein, a jaw mounted to slide in the upper bracket and in alinement substantially with said screw and having a beveled lower end, a second jaw pivoted at one end on said standard between said brackets and projecting outwardly between said screw and jaw and having an upwardly turned outer portion, the upwardly inclined lower face of said pivoted jaw resting on said screw and the correspondingly inclined upper face of said pivoted jaw forming a seat for a saw tooth inserted between said face and said sliding jaw, and a saw support mounted to position the teeth of the saw between said jaws.

4. The combination, with a standard, of plates longitudinally slotted and spaced apart to straddle said standard, and slidable horizontally thereon, a clamp for a band saw provided at one end of said plates on one side of said standard, a clamp for a circular saw carried by said plates on the other side of said standard, and tooth setting jaws carried by said standard between said clamps.

5. The combination, with an upright standard, of a bracket mounted thereon and having a vertical socket therein and a set screw fitting within said socket and vertically movable therein, a jaw pivoted above said bracket in said standard and projecting outwardly therefrom and overhanging said set screw to contact therewith, a reciprocating jaw mounted in said standard above said set screw, a lever for operating said reciprocating jaw, and a suitable support for positioning the teeth of a saw between said reciprocating jaw and said pivoted jaw.

In witness whereof, we have hereunto set our hands this 13th day of March, 1916.

ANDREW B. ANDERSON.
JOHN L. PETERSEN.

Witnesses:
J. M. TAFAGER,
D. WOOD.